United States Patent
Matsuda

(10) Patent No.: US 7,382,108 B2
(45) Date of Patent: Jun. 3, 2008

(54) CHARGING APPARATUS AND CHARGING CURRENT DETECTING CIRCUIT THEREOF

(75) Inventor: Shoji Matsuda, Iwate-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 81 days.

(21) Appl. No.: 10/882,908

(22) Filed: Jun. 30, 2004

(65) Prior Publication Data

US 2005/0007064 A1 Jan. 13, 2005

(30) Foreign Application Priority Data

Jul. 7, 2003 (JP) ............................. 2003-193097

(51) Int. Cl.
*H02J 7/00* (2006.01)
*H02J 7/04* (2006.01)
*H02J 7/16* (2006.01)

(52) U.S. Cl. .................. 320/103; 320/107; 320/134; 320/149; 320/161

(58) Field of Classification Search ............... 320/103, 320/162, 149, 114
See application file for complete search history.

(56) References Cited

U.S. PATENT DOCUMENTS

| | | | |
|---|---|---|---|
| 5,345,162 A | | 9/1994 | Shiojima |
| 6,054,861 A | * | 4/2000 | Takahashi .................... 324/428 |
| 6,307,349 B1 | * | 10/2001 | Koenck et al. ............. 320/112 |
| 2002/0190689 A1 | * | 12/2002 | Nakamura et al. .......... 320/102 |

FOREIGN PATENT DOCUMENTS

| | | |
|---|---|---|
| JP | 05-137276 | 6/1993 |
| JP | 11-187588 | 7/1999 |
| JP | 2003-233427 | 8/2003 |

* cited by examiner

*Primary Examiner*—Bao Q. Vu
*Assistant Examiner*—Alexis Boateng
(74) *Attorney, Agent, or Firm*—Brinks Hofer Gilson & Lione

(57) ABSTRACT

A charging apparatus and a charging current detecting circuit thereof are disclosed in which it is possible to implement an electric circuit with little voltage loss by using an operational amplifier of low cost. A detecting resistor is disposed at the power voltage side of the downstream side of a power supply. The charging apparatus further includes an auxiliary power means for generating an auxiliary voltage to supplement the voltage limited to the range of an input voltage of the operational amplifier.

1 Claim, 2 Drawing Sheets

CHARGING APPARATUS AND CHARGING CURRENT DETECTING CIRCUIT THEREOF

This application claims the benefit of priority to Japanese Patent Application No. 2003-193097, herein incorporated by reference.

BACKGROUND OF THE INVENTION

1. Field of the Invention

The present invention relates to a charging apparatus and a charging current detecting circuit thereof, and more specifically, to a charging apparatus and a charging current detecting circuit that charge a secondary battery by supplying a charging current from a power supply to the secondary battery.

2. Description of the Related Art

Generally, a charging current detecting circuit for detecting a charging current supplied from a power supply to a secondary battery is provided in a charging apparatus for charging the secondary battery.

FIG. 2 shows an example of a charging apparatus 2, such as an AC adapter, comprising such a charging current detecting circuit 1.

The charging apparatus 2 comprises a power supply 3 having a predetermined voltage (24 V in FIG. 2). By supplying the charging current to a secondary battery 4 using the power supply 3, the secondary battery 4 is charged.

An emitter of a controlling transistor 6 for controlling the supply of the charging current is connected to a power voltage side (24 V side) located at the downstream side of the power supply 3, and a collector of the controlling transistor 6 is connected to an anode of the secondary battery 4.

On the other hand, a ground side (0 V side) of the power supply 3 is connected to a cathode of the secondary battery 4.

In addition, a detecting resistor 7 serving as the main element of a charging current detecting circuit 1 is disposed at the ground side located at the downstream side of the power supply 3. The value of the charging current can be detected using the voltage drop caused by the detecting resistor 7.

The upstream side of the detecting resistor 7 is connected to a cathode of a variable battery 5, and the downstream side of the detecting resistor 7 is connected to a non-inversion input terminal of an operational amplifier 9. In addition, an anode of a variable battery 5 is connected to an inversion input terminal of the operational amplifier 9. Further, an output side of the operational amplifier 9 is connected to a base of the controlling transistor 6 via a resistor 8.

The variable battery 5 outputs a charging current setting signal to the operational amplifier 9. In addition, the operational amplifier 9 receives an input of the charging current setting signal and controls electrical conduction of the controlling transistor 6 such that a setting voltage of the charging current setting signal is the same as the voltage drop caused by the detecting resistor 7.

In addition, the operational amplifier 9 is driven by a voltage applied from the power supply 3. Further, when the operational amplifier 9 is driven, the controlling transistor 6 controls the supply of the charging current to the secondary battery 4. (See Japanese Unexamined Patent Application Publication No. 05-137276)

In the charging apparatus 2 as shown in FIG. 2, the detecting resistor 7 is disposed at the ground side (0 V side) of the downstream side of the power supply 3. However, in this case, the operational amplifier 9, which is inexpensive and is operated until an input voltage is almost 0V, can be used.

However, depending on the particular circuit, the detecting resistor 7 may be disposed at the power voltage side (24 V side).

In the operational amplifier 9 of the above cases, the input voltage range (for example, 21 V) is limited to have a value lower than the power voltage (for example, 24 V). As a result, the input voltage (2 V) is insufficient to drive the operational amplifier 9.

On the other hand, if the detecting resistor 7 is disposed at the power voltage side, an operational amplifier 10, such as a rail-to-rail operational amplifier that operates suitably under the power voltage may be used. However, the rail-to-rail operational amplifier is high in cost (FIG. 3)

According to the conventional art, because the detecting resistor 7 is disposed at the ground side (0 V side), the ground of the secondary battery 4 is connected to the ground of the system, as in an electronic apparatus that is connected to the charging apparatus 2, by the detecting resistor 7 without being directly connected to each other.

For this reason, when the system is driven by the power 3 of the charging apparatus 2 without using the secondary battery 4 or when the system is driven by the secondary battery 4 charged by the charging apparatus 2, a loss in voltage is generated due to a voltage drop caused by the detecting resistor 7.

SUMMARY OF THE INVENTION

Accordingly, the present invention is designed to solve the above problems, and it is an object of the present invention to provide a charging apparatus and a charging current detecting circuit thereof, that is capable of realizing an electric circuit having minimized voltage loss by using an operational amplifier which is low in cost.

As a first aspect to achieve the above object, the present invention provides a charging apparatus which comprises a power supply for supplying a charging current to a secondary battery; a detecting resistor disposed at the downstream side of the power supply for detecting the charging current; and an operational amplifier for applying a voltage from the power, wherein the detecting resistor is disposed at the power voltage side of the downstream side of the power supply and wherein the charging apparatus further comprises an auxiliary power means for generating an auxiliary voltage to supplement the voltage limited to the range of an input voltage of the operational amplifier.

In addition, according to such a configuration, even when an operational amplifier of low cost is used, it is possible to supplement the voltage limited to the range of an input voltage of the operational amplifier by using a simple configuration, thereby suitably driving the operational amplifier. Further, since the ground of a system can be directly connected to the ground of a secondary battery, it is possible to realize an electric circuit with little voltage loss.

In the charging apparatus according to the present invention, the auxiliary power means comprises signal generating means for generating a signal containing an alternating current component; an AC coupling capacitor for AC-coupling a signal output from the signal generating means; a first diode for clamping the AC-coupled signal to the power voltage; and a second diode disposed at the downstream of the AC-coupling capacitor and first diode for rectifying a signal.

In addition, according to the above configuration, it is possible to constitute the auxiliary power means with a further simple configuration and low cost.

As a second aspect to achieve the above object, the present invention provides a charging current detecting circuit disposed in a charging apparatus having an operational amplifier for applying a voltage from a power supply, in which a charging current is supplied from the power to a secondary battery. The charging current detecting circuit comprises a detecting resistor for detecting the charging current, and the detecting resistor is disposed at the power voltage side of the downstream side of the power supply. The charging current detecting circuit further comprises an auxiliary power means for generating an auxiliary voltage to supplement the voltage limited to the range of an input voltage of the operational amplifier.

In addition, according to such a configuration, even when an operational amplifier of low cost is used, it is possible to supplement the voltage limited to the range of an input voltage of the operational amplifier by using a simple configuration, thereby suitably driving the operational amplifier. Further, since the ground of a system can be directly connected to the ground of a secondary battery, it is possible to implement an electric circuit with little voltage loss.

DESCRIPTION OF THE PREFERRED EMBODIMENTS

Figure 1:
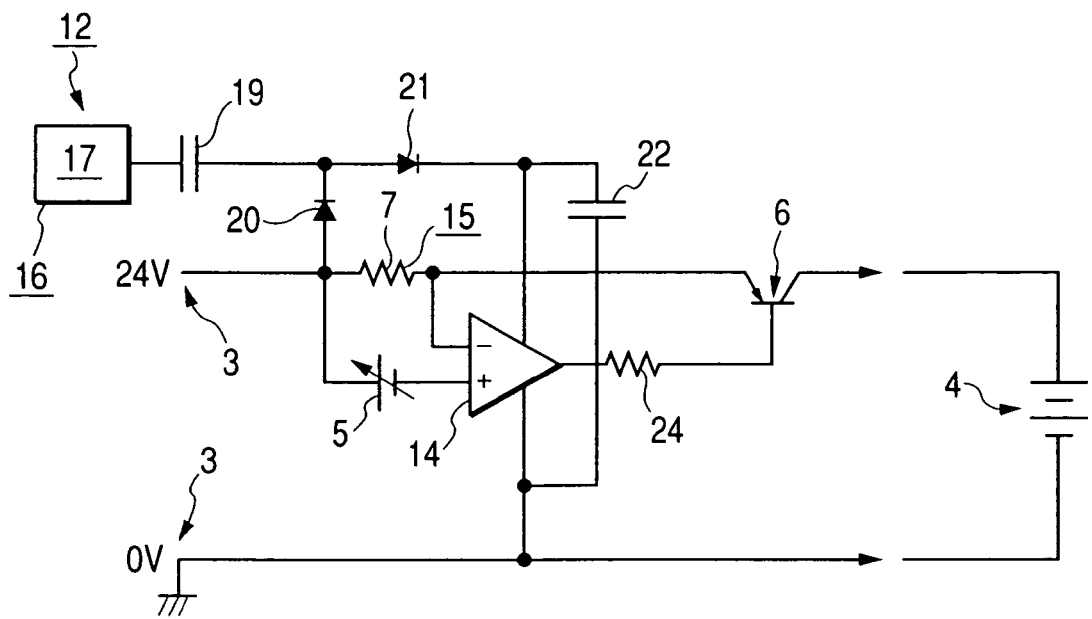
FIG. 1 is an electric circuit diagram illustrating a charging apparatus and a charging current detecting circuit thereof according to an embodiment of the present invention.
Figure 2:
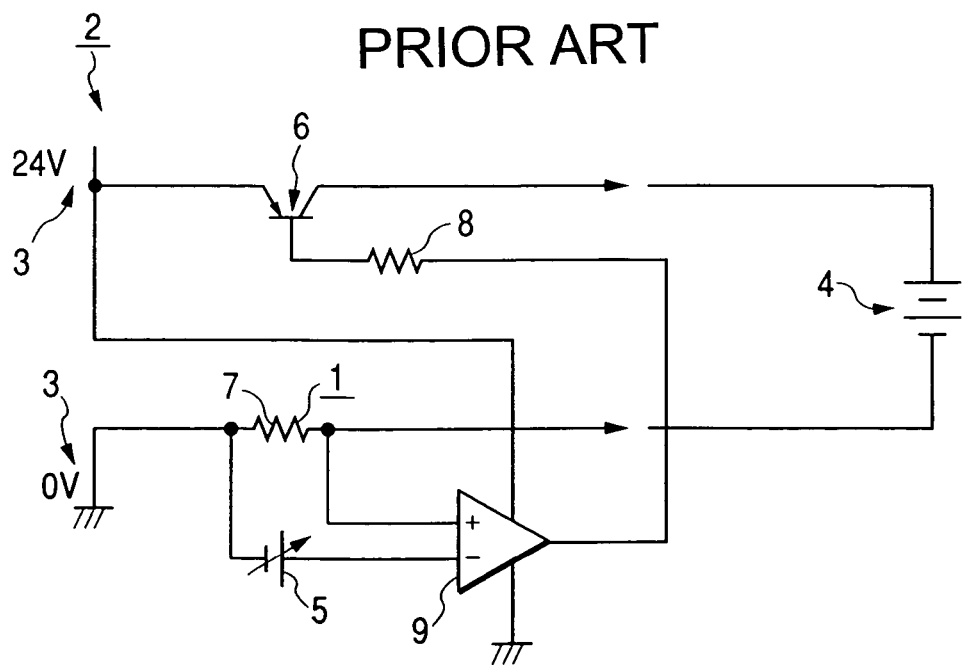
FIG. 2 is an electric circuit diagram illustrating an example of a charging apparatus and a charging current detecting circuit thereof according to a conventional art.
Figure 3:
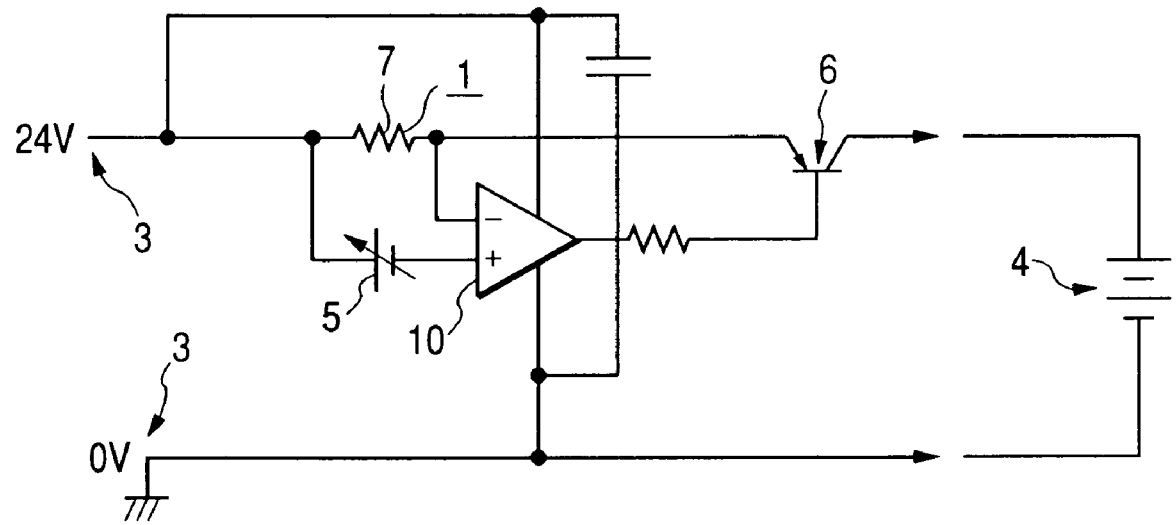
FIG. 3 is an electric circuit diagram illustrating another example of a charging apparatus and a charging current detecting circuit thereof according to a conventional art, which is different from that shown in FIG. 2.

Hereinafter, an embodiment of a charging apparatus and a charging current detecting circuit thereof according to the present invention will be described in detail with reference to FIG. 1.

Further, the constituent elements corresponding to a conventional embodiment are denoted by the same reference numerals indicated in the conventional embodiment.

As shown in FIG. 1, a charging apparatus 12 according to the present embodiment comprises a power supply 3 for supplying a charging current to a secondary battery 4; a detecting resistor 7 disposed at the downstream side of the power supply 3 for detecting the charging current; and an operational amplifier 14 for applying a voltage from the power supply 3.

In the present embodiment, the detecting resistor 7 constituting a charging current detecting circuit 15 is disposed at a power voltage side (24 V side) of the downstream side of the power supply 3.

In addition, the charging apparatus 12 according to the present embodiment comprises auxiliary voltage means 16. The auxiliary voltage means 16 generates an auxiliary voltage for supplementing the voltage supplied, which is limited to the range of an input voltage of the operational amplifier 14.

Accordingly, even when the operational amplifier 14 of low cost is used, it is possible to supplement the voltage supplied, which is limited to the range of an input voltage of the operational amplifier 14 in a simple configuration, thereby suitably driving the operational amplifier 14.

As shown in FIG. 1, since a ground of a system can be directly connected to a ground of a secondary battery 4, it is possible to realize an electric circuit with little voltage loss.

Further, in a detail description of the configuration of the auxiliary power means 16, the auxiliary power means 16 comprises signal generating means 17, such as a clock, for generating a signal containing an alternating current component. The signal generating means 17 outputs a signal having predetermined amplitude.

An AC coupling capacitor 19 is connected to the downstream of the signal generating means 17. The AC coupling capacitor 19 AC-couples a signal output from the signal generating means 17 and then extracts an alternating current component.

A cathode (negative polarity) of first diode 20 for clamping the AC-coupled signal by the AC coupling capacitor 19 to the voltage of the power 3 is connected to the downstream side of the AC coupling capacitor 19. Further, an anode (positive electrode) of the first diode 20 is connected to the power voltage side of the power 3 (24V side in FIG. 1).

Further, an anode of a second diode 21 is connected to the downstream side of the cathode side of the first diode 20. The second diode 21 rectifies the signal having been clamped by the first diode 20.

In addition, a smoothing capacitor 22 is connected to the downstream side of the second diode 21, and a voltage whose waveform is smoothed by the capacitor 22 is applied to the operational amplifier 14.

As a result, it is possible to implement the auxiliary power means 16 with a further simple construction at low cost.

In addition, the upstream side of the detecting resistor 7 is connected to an anode of the first diode 20 and an anode of a variable battery 5, and the downstream side of the detecting resistor 7 is connected to an inversion input terminal of the operational amplifier 14. Further, a cathode of the variable battery 5 is connected to a non-inversion input terminal of the operational amplifier 14.

In addition, the output side of the operational amplifier 14 is connected to a base of a controlling transistor 6 via a resistor 24, the power supply 3 is connected to an emitter of the controlling transistor 6, and the anode of the secondary battery 4 is connected to a collector of the controlling transistor 6.

Next, an operation of the present embodiment will be described.

In the present embodiment, as in a conventional art, the power supply 3 supplies a charging current to the secondary battery 4, and at this time, the detecting resistor 7 detects the charging current.

Here, a voltage exceeding the voltage of the power supply 3 is generated in the operational amplifier 14.

In other words, when the signal generating means 17 of the auxiliary voltage means 16 outputs an alternating current signal having a predetermined amplitude (for example, an amplitude of 3 V), the alternating current signal is AC-coupled by the AC coupling capacitor 19. After that, the signal is clamped to the voltage of the power supply 3 by the first diode 20.

Thereafter, the clamped signal is rectified by the second diode 21, and then the capacitor 22 smoothes a waveform of the signal. As a result, a voltage (27 V) in which a predetermined auxiliary voltage (3 V) is supplemented to the power voltage (24 V) is generated and applied to the operational amplifier 14.

For this reason, when a range of an input voltage of the operational amplifier 14 is limited to a range (21 V) lower than the power voltage (24 V), it is possible to supplement the limited amount by the auxiliary voltage (3 V), thereby suitably driving the operational amplifier 14.

Hence, according to the present embodiment, by providing the auxiliary power means 16, it is possible to supplement the voltage which was limited to the range of an input voltage of the operational amplifier 14. As a result, when the detecting resistor 7 is provided at the power voltage side, a suitable operation can be obtained by using the operational amplifier 14 of low cost. In addition, since the ground of the secondary battery 4 is directly connected to the ground of the system, it is possible to implement an electric circuit with little voltage loss.

In addition, the present invention is not limited to the present embodiment, and a various modification can be made, if necessary.

As described above, according to the charging apparatus of the present invention, even when the detecting resistor is disposed at the power voltage side, it is possible to realize a charging apparatus having comprised with an operational amplifier of low cost, in which the charging can be performed with little voltage loss.

In addition, according to the charging apparatus of the present invention, it is possible to realize a charging apparatus of still more low cost.

In addition, according to the charging current detecting circuit of the present invention, when the detecting resistor is disposed at the power voltage side, the operational amplifier of low cost can be used. Accordingly, it is possible to implement an electric circuit with little voltage loss.

What is claimed is:

1. A charging apparatus comprising:
   a power supply that supplies a charging current to a secondary battery;
   a detecting resistor that detects the charging current, the detecting resistor being disposed at a power voltage side of a downstream side of the power supply;
   an operational amplifier that applies a voltage from the power supply;
   a control transistor that controls the supply of the charging current, wherein an emitter terminal of the control transistor is connected to the downstream side of the power supply with the detecting resistor therebetween, a collector terminal of the control transistor is connected to the positive electrode of a secondary battery, and a base terminal of the control transistor is connected to an output terminal of the operational amplifier, and the negative electrode of the secondary battery is connected to a ground terminal of the power supply; and
   a charging current detecting circuit, which comprises the detecting resistor and an auxiliary power generator that generates an auxiliary voltage to supplement a voltage limited to the range of an input voltage of the operational amplifier,
   wherein one end of the detecting resistor connects the positive electrode of the power supply, and the other end of the detecting resistor connects an inverting input terminal of the operational amplifier, and a non-inverting input terminal of the operational amplifier connects the positive electrode of the power supply, and
   wherein the auxiliary power generator comprises a signal generator connected to a power supply terminal of the operational amplifier that generates a signal containing an alternating current component; an AC coupling capacitor that AC-couples a signal output from the signal generator; a first diode that clamps the AC-coupled signal to the power voltage; and a second diode disposed at a downstream side of the AC-coupling capacitor and first diode that rectifies a signal; and, the cathode of the first diode and the anode of the second diode connected to each other, and the cathode of the second diode and the power supply terminal of the operational amplifier are connected to each other.

* * * * *